United States Patent [19]

Wright

[11] 4,243,184
[45] Jan. 6, 1981

[54] CUTTING BOARD

[76] Inventor: Anthony A. Wright, 1801 Diamond St. #3-113, San Diego, Calif. 92109

[21] Appl. No.: 59,317

[22] Filed: Jul. 20, 1979

[51] Int. Cl.³ .................. B02C 19/20; A47J 43/25
[52] U.S. Cl. ........................ 241/273.2; 269/289 R
[58] Field of Search ............ 241/95, 273.1, 273.2, 241/273.3, 273.4; 269/289 R, 302.1; D7/46

[56] References Cited

U.S. PATENT DOCUMENTS

| 157,283 | 12/1874 | Gurney | 269/302.1 X |
|---|---|---|---|
| 1,922,973 | 8/1933 | Mischanski | 241/273.1 |
| 2,452,445 | 10/1948 | Ericsson | D7/46 X |
| 2,550,896 | 5/1951 | Wickner | 241/95 X |
| 3,416,584 | 12/1968 | Rowley | 241/95 |
| 4,017,063 | 4/1977 | Brusich | 269/302.1 |
| 4,041,964 | 8/1977 | Shamoon | 269/302.1 X |

FOREIGN PATENT DOCUMENTS 2260259  8/1975  France .................................. 269/302.1

Primary Examiner—Howard N. Goldberg
Attorney, Agent, or Firm—Brown & Martin

[57] ABSTRACT

A cutting board for use in chopping or cutting food articles is adapted to fit over a sink and particularly fit between the bowls of a double sink with supporting means that is adjustable to fit different sizes of sinks. The board includes a grating device on one side of the board with a tray adapted to receive cuttings from the grating device. The board is adapted to be reversible and to rest on mounting supports on a flat surface.

10 Claims, 3 Drawing Figures

CUTTING BOARD

BACKGROUND OF THE INVENTION

The present invention relates to culinary cutting boards and pertains particularly to an improved over the sink cutting board.

Over the sink cutting boards which mount and are supported above a sink by means of extensible arms or the like are known. Such boards, however, are limited to the placement over one sink and effectively block the use of that sink during utilization of the board. Some boards permit a certain degree of use of the sink by providing an opening through which cuttings and materials may be discarded into the sink.

The present invention is adapted to permit the continued use of both sinks of a double sink, while at the same time having a cutting board set up for utilization.

The prior art boards also frequently result in the waste of cuttings because it is necessary to rake the cuttings from the board into a bowl or the like. Such boards also fail to provide means for preventing slippery articles such as roast beef or the like from slipping about on the board when cut. It has been found that and it is appreciated that many items that need to be carved are quite slippery when freshly cooked. Such items as roast beef, turkey, chicken, duck and the like tend to slip about on the board when one is attempting to carve them.

It is therefore desirable that some board is available which over comes the above problems of the prior art.

SUMMARY AND OBJECTS OF THE INVENTION

It is therefore the primary object of the present invention to overcome the above problems of the prior art.

Another object of the present invention is to provide an improved cutting board which is adapted to rest between the bowls of a double sink to permit utilization of both sinks all at the same time utilizing the cutting board.

Another object of the invention is to provide an improved cutting board having means for receiving cuttings built into the board.

Another object of the invention is to provide means which prevent slipping of articles on the board.

It is also a further object of the present invention to provide means for permitting the grating of materials built into the board and to receive the grated materials.

In accordance with the primary aspect of the present invention an improved cutting board is provided which has adjustable mounting means that also include a tray for receiving cuttings and includes mounting means for permitting mounting of the board between a double sink. Another aspect of the invention provides a grating cutter in combination with the board for combined grating of materials as well as prevent slippage of materials being cut on the board.

BRIEF DESCRIPTION OF THE DRAWINGS

The above and other objects and advantages of the present invention will become apparent from the following description when read in conjunction with the drawings wherein.

DETAILED DESCRIPTION OF THE PREFERRED EMBODIMENT

Figure 1:
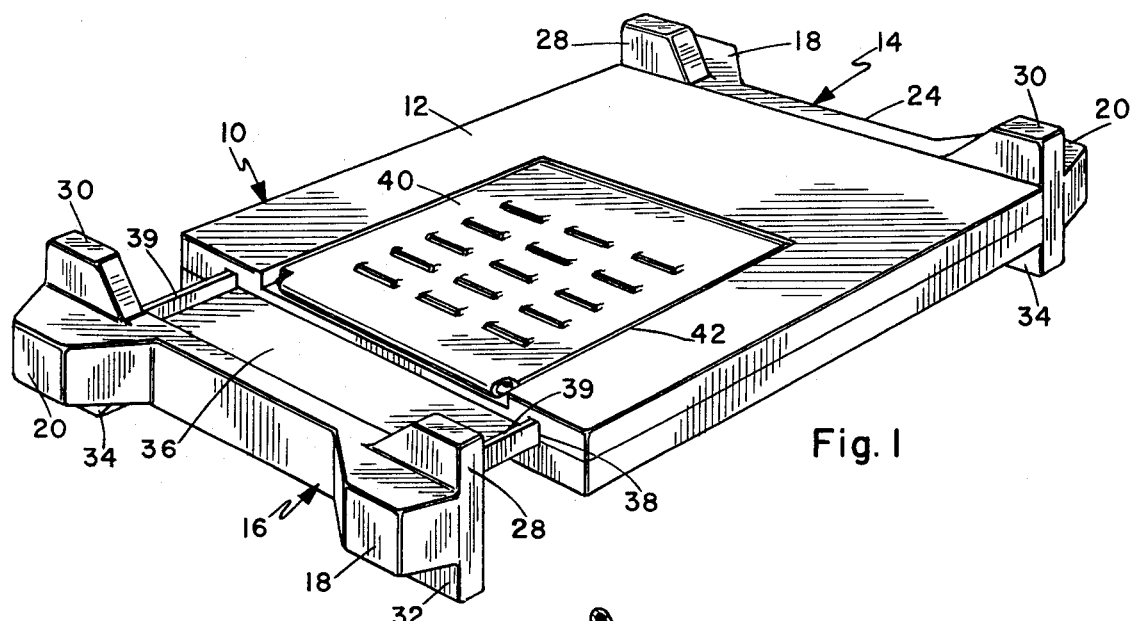
FIG. 1 is a perspective view of the board in accordance with the invention.

Turning now to the drawings, particularly FIG. 1, there is illustrated a board in accordance with the invention designated generally by the numeral 10. This board as illustrated comprises a main board section 12 which may be constructed of any suitable material such as wood or a suitable molded plastic. The board is constructed preferably of a generally rectangular configuration having a pair of generally rectangular spaced apart faces on opposite sides thereof for use in cutting and chopping of articles of food and the like. The board includes a mounting member 14 fixed to one end of the board and a movable mounting member 16 on the outer end of the board. Each mounting member is identical as to the specific mounting features thereof and these features will be specifically described with respect to the mounting member 14 with it being understood that these features are substantially identical on the member 16.

The mounting member 14 includes a pair of outwardly extending lugs 18 and 20 for projecting over the edge or walls of a sink 22 for supporting the board on the upper periphery of the sink. The outwardly projecting lugs 18 and 20 are separated and provide a cut-out or scalloped portion 24 for mounting around the base of a water faucet or the like 26.

Figure 3:
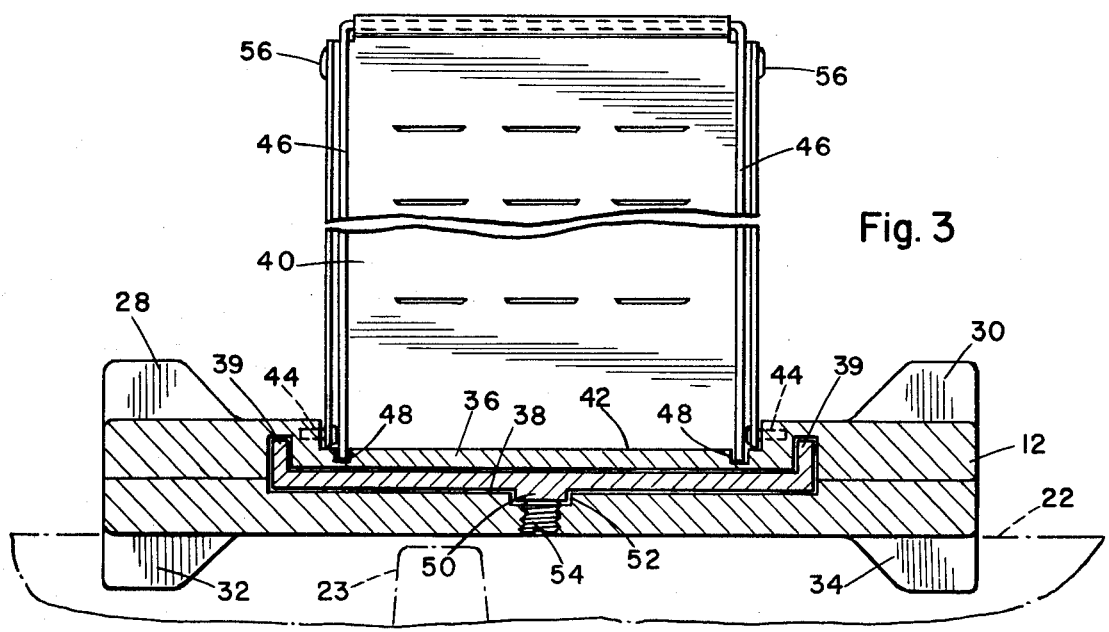
FIG. 3 is a section view taken on line 3—3 of FIG. 2.

The mounting device also includes a pair of identical upwardly extending lugs 28 and 30 projecting upward on one side and similar lugs 32 and 34 projecting downward from the opposite side for extending downward to engage the inner walls 22 of the sink. The construction of separately spaced apart lugs as illustrated permits the mounting member to span the center section or dividing wall 23 of a double sink (FIG. 3). With this arrangement the board can be placed in the center between the two bowls of a double sink and supported directly above the center divider of the sink. These lugs also serve as legs to support the board on a flat surface such as a table or counter top in either inverted position. The grating cutter is thereby supported above and out of engagement with the table or counter surface.

This permits full utilization of both sinks while at the same time leaving the cutting board in place for use. The board is preferably constructed of a dimension which permits the water to be directed to either side of the board. The board is reversible, that is, it can be turned with either side up and utilized and has other features and characteristics as will be described.

Figure 2:
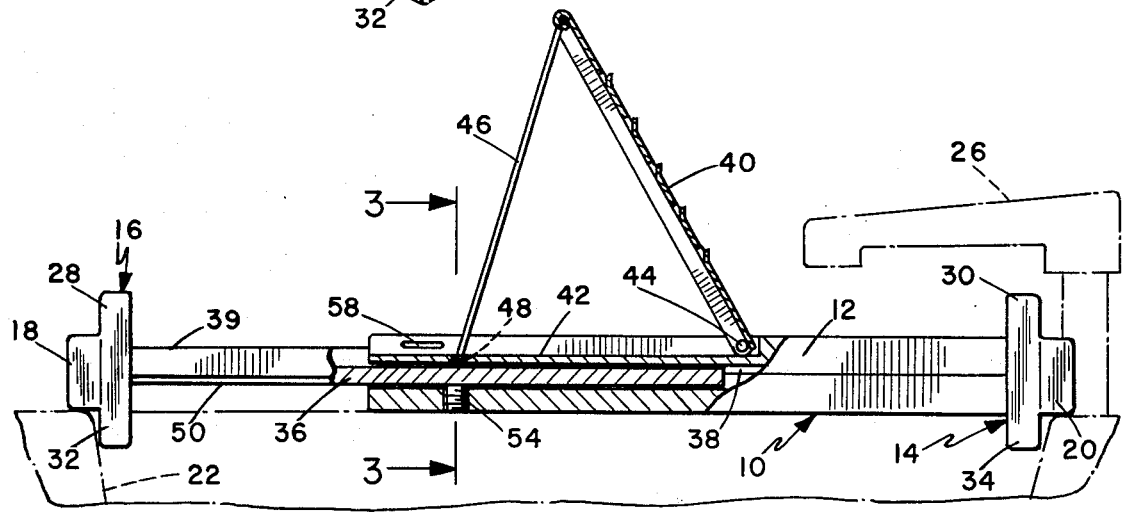
FIG. 2 is a side elevation view showing the board mounted and in use.

As shown in FIGS. 1 and 2, the board includes a tray 36 which is slidably fitted within a recess 38 or generally U-shaped slot formed within the board. The recess may be formed in any suitable fashion and includes a suitable guide means as is well known in the tray making art. The mounting member 16 is identical to the mounting member 14 but is secured on one end of the tray making the mounting member extensible inward or outward for mounting on different sizes of sinks. The tray has an open side contained between side flanges 39 so that cuttings from the board can be raked into the tray and can then be poured from the tray into a bowl or the like. This reduces the lose and waste from the board, of cuttings of food as will be appreciated.

An additional feature of the invention is the provision of a grating member 40 which is of a substantially conventional configuration, having means for cutting or grating carrots, cabbage and the like. The cutting board 40 is fitted within a recess 42 and is pivotally mounted by hinges 44 to one end of the board, with support legs 46 hingedly connected to the other end of the grating device to fit into suitable bores or sockets 48 within the board.

The tray slides out to an open position as shown in FIG. 2 to position the mounting member 16 on the edge of the sink and to open the tray for receiving cuttings or gratings from the board or the grater. The tray 36 is provided with a guide rail 50 riding in a tract or guide slot 52 within the board. The guide rail 50 provides a reinforcement for receiving a set screw 54 which is threaded in a bore in the lower side of the board for engagement with the rail 50, for securing the tray 36 and the mounting member 16 in the extended position. The set screw 54 preferably has an enlarged slot to receive a coin or the like or any kitchen utensil such as a knife or the like for securing the set screw against the guide member of the extended tray. Other suitable means may be provided for fitting or securing the tray in its extended or closed position.

The grating member is preferably fitted with a suitable detent mechanism of conventional design such as a slight projection at 56 on each side thereof which extends into a depression 58 at the side of the cut-out in which the grating member fits.

The grating member, in addition to serving its grating function, also serves to support meats, such as roast beef, roast fowl and the like in position during carving to prevent it from slipping about on the board. The position of the grater also permits the grater to be easily and conveniently used with the removal of the grated materials into the tray 36. The detents 56, 58 hold the grater device in its retracted position as shown in FIG. 1 when the board is inverted. If it is desired to cut other articles or material which is not desired to rest on the grater, such articles can be placed on the opposite side of the board.

As previously explained the cutting board can be formed of any suitable materials such as a durable plastic which permits the quick and convenient molding of the device and which is resistant to a cutting edge to withstand continuous use. Alternately, the board can be constructed of wood in a conventional fashion, and the various components thereof shaped as desired. Each type of construction i.e. each different material would, of course, have certain advantages over the other materials. In addition to construction of the device or cutting board from different materials, the tray 36 can be formed if desired to be a double tray open to either side of the board. Alternately, the board can be constructed such that the tray may be inverted to fit either side of the slot to open to either side of the board. This would require only minor modifications in some of the components of the board as actually shown.

Thus, while I have illustrated and described my invention by means of specific embodiments it is to be understood that numerous changes and modifications may be made therein without departing from the spirit and scope of the invention as defined in the dependent claims.

I claim:

1. An extensible sink mounting cutting board comprising in combination:
   a cutting board body having a pair of spaced apart generally planar rectangular surfaces,
   a first support member fixed to one end of the board for engaging the periphery of a sink for support of the board over the sink and including means for retaining the board in position relative to the sink,
   a tray slidably mounted in the other end of the board and including an open side to catch cuttings, and
   a second support member on said tray for engaging the periphery of the sink for support of the board.

2. The cutting board of claim 1 wherein said first and second support members each comprises a first pair of spaced apart lug members extending co-planar with the board for resting on the periphery of the sink and
   a second pair of spaced apart lug members for engaging the inside of said sink near the top thereof.

3. The cutting board of claim 2 wherein said support members are adapted to support said board over the divider between the bowls of a double sink, and
   one of said support members includes a cut-out portion for receiving the body of a faucet.

4. The cutting board of claim 1 including a grating device mounted on the side of said board to which the tray opens,
   said grating device being pivotally mounted on said board so that grated material falls on said board adjacent said tray.

5. The cutting board of claim 4 wherein said grater pivots from a recessed portion on said board to an operative position.

6. The cutting board of claim 4 including means for securing said tray in selected extended position.

7. A double sided sink mounted cutting board, said board comprising;
   a main body member having a pair of spaced apart planar cutting surfaces defined by opposite faces of the board;
   a fixed mounting member secured to one end of the board and including a pair of spaced apart outwardly extending lugs for extending around the body of a faucet for supporting the one end of the board on the periphery of and between the bowls of a double bowl sink; and
   a movable mounting member including a slide member slidably mounted in a recess in said main body member and including outwardly extending lug means for supporting the other end of the board between the bowls of a double sink.

8. The cutting board of claim 7 wherein said movable mounting member includes a pair of spaced apart outwardly extending lug members, and
   each of said mounting members includes a pair of spaced apart lug members extending outward from each side of said cutting board for engaging the inner wall of the bowls of said sink.

9. The cutting board of claim 8 wherein said slide member comprises a tray.

10. The cutting board of claim 8 wherein said cutting board is molded from a durable plastic.

* * * * *